United States Patent
Cai

(10) Patent No.: US 9,732,625 B2
(45) Date of Patent: Aug. 15, 2017

(54) SYSTEM AND METHOD FOR CONTROLLING A GAS TURBINE ENGINE

(71) Applicant: UNITED TECHNOLOGIES CORPORATION, Farmington, CT (US)

(72) Inventor: Chaohong Cai, Westogue, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 329 days.

(21) Appl. No.: 14/599,921

(22) Filed: Jan. 19, 2015

(65) Prior Publication Data

US 2016/0208639 A1   Jul. 21, 2016

(51) Int. Cl.
| | |
|---|---|
| F01D 21/00 | (2006.01) |
| F01D 17/10 | (2006.01) |
| F01D 17/06 | (2006.01) |
| G05B 13/04 | (2006.01) |

(52) U.S. Cl.
CPC ........... *F01D 21/003* (2013.01); *F01D 17/06* (2013.01); *F01D 17/105* (2013.01); *G05B 13/048* (2013.01); *F05D 2220/32* (2013.01); *F05D 2240/12* (2013.01); *F05D 2270/304* (2013.01); *F05D 2270/335* (2013.01); *F05D 2270/52* (2013.01); *F05D 2270/62* (2013.01)

(58) Field of Classification Search
CPC ...... F01D 21/003; F01D 17/06; F01D 17/105; G05B 13/04; G05B 13/048; F05D 2220/32; F05D 2240/12; F05D 2270/304; F05D 2270/31; F05D 2270/335; F05D 2270/52; F05D 2270/54; F05D 2270/56; F05D 2270/62; F05D 2270/64; F05D 2270/65

See application file for complete search history.

(56) References Cited

U.S. PATENT DOCUMENTS

| | | | |
|---|---|---|---|
| 2004/0123600 A1* | 7/2004 | Brunell | F02C 9/00 60/773 |
| 2005/0222822 A1 | 10/2005 | Muramatsu et al. | |
| 2007/0013195 A1* | 1/2007 | Mukavetz | F01D 17/162 290/52 |
| 2008/0027617 A1* | 1/2008 | Zagranski | F02C 9/28 701/100 |
| 2008/0229754 A1* | 9/2008 | Goebel | F02C 9/00 60/772 |
| 2011/0054704 A1 | 3/2011 | Karpman et al. | |
| 2013/0158680 A1 | 6/2013 | Fuller | |
| 2015/0345403 A1 | 12/2015 | Cai et al. | |

OTHER PUBLICATIONS

European Search Report for Application No. EP 16 15 1977.

* cited by examiner

*Primary Examiner* — Dennis M Butler
(74) *Attorney, Agent, or Firm* — Cantor Colburn LLP

(57) ABSTRACT

A control system for a gas turbine engine including a power turbine is disclosed. The control system may include a control module to receive engine operating goals and an estimated current engine state, wherein the estimated current engine state is produced by a model-based estimation module using a bandwidth signal produced by an adaptation logic module. The control module is operative to determine fuel flow, inlet guide vane schedules and stability bleed schedules based at least in part on the received engine operating goals and the estimated current engine state, and to send signals to a gas generator of the gas turbine engine in order to control the gas generator according to the determined fuel flow, inlet guide vane schedules and stability bleed schedules.

20 Claims, 12 Drawing Sheets

SYSTEM AND METHOD FOR CONTROLLING A GAS TURBINE ENGINE

TECHNICAL FIELD OF THE DISCLOSURE

The present disclosure is directed generally toward gas turbine engines, and more specifically toward a control system and method for a gas turbine engine.

BACKGROUND OF THE DISCLOSURE

A gas turbine power system can include a control system, a gas turbine engine having a plurality of engine actuators, and a plurality of engine sensors. The control system controls the engine by generating and providing effector signals to the engine actuators. The term "effector signal" is used herein to describe a command signal that controls operation of the engine through the engine actuators.

The effector signals can be generated by processing goals, limits and a basepoint estimate by a control system such that at least some of the goals are satisfied, subject to each limit being held (i.e., no limit is violated). An example of a goal is to operate the engine at a certain thrust level. An example of a limit (i.e., a maximum or minimum) is to prevent an engine component or system from exceeding a certain temperature. A limit is "active" when its limit value has been met; e.g., when a temperature of a component is, or is predicted to be, at or above a maximum limit temperature. A basepoint estimate is a set of goal and limit values that correspond to an equilibrium point at which each active limit is held and at least some of the goals are satisfied.

During operation, the engine may experience various real-time changes in its system parameters. Changes in the system parameters can result from updated control signals, changes in environmental conditions and changes in operating conditions. Such changes can create discrepancies between engine parameters predicted by the control system and corresponding engine parameters measured by the engine sensors, which in turn can create error in the estimated basepoint.

A typical engine controller can compensate for discrepancies between predicted and measured engine parameters by determining basepoint error and correcting the next basepoint estimate as a function of the basepoint error. The basepoint error can be determined as a function of the goals, inequality limit equations derived from the limits, and equality basepoint equations generated by a basepoint estimator.

There is a need in the art, therefore, for an engine control system that can at least partially compensate for engine modeling errors and/or changes in engine operating conditions. There also exists a need for an engine control system that matches the change in power demand while maintaining a constant rotor speed.

SUMMARY OF THE DISCLOSURE

In one embodiment, a control system for a gas turbine engine is disclosed, the control system comprising: at least one first sensor configured operative to generate a thrust lever angle signal indicative of a thrust lever angle commanded of the gas turbine engine; at least one second sensor in communication with the gas turbine engine and configured operative to generate at least one operating parameter signal indicative of at least one operating parameter of the gas turbine engine; a power rating module configured operable to receive the thrust lever angle signal and generate at least one goal signal indicative of an operating point goal for the gas turbine engine; an adaptation logic module configured operable to receive the at least one goal signal and the at least one operating parameter signal and generate a bandwidth signal indicative of an error between the at least one goal signal and the at least one operating parameter signal; a model-based estimation module configured operable to receive the bandwidth signal and generate an engine estimate signal indicative of estimated current engine parameters of the gas turbine engine based at least in part on the bandwidth signal; and a model-based control module configured operable to receive the at least one operating parameter signal, the at least one goal signal, and the engine estimate signal and to determine at least one of fuel flow, inlet guide vane schedules and stability bleed schedules based at least in part on the received at least one operating parameter signal, the at least one goal signal and the engine estimate signal, and to send effector signals to a gas generator of the gas turbine engine in order to control the gas generator according to at least one of the determined fuel flow, inlet guide vane schedules and stability bleed schedules.

In a further embodiment of the above, the model-based control module is configured to use a model-based constrained dynamic inversion methodology to determine at least one of the fuel flow, the inlet guide vane schedules and the stability bleed schedules.

In a further embodiment of any of the above, the at least one operating parameter signal comprises at least one of real-time speed, power, torque and thrust of the gas turbine engine.

In a further embodiment of any of the above, the power rating module utilizes predetermined tables to generate the at least one goal signal.

In a further embodiment of any of the above, the model-based control module is also further configured to receive signals indicative of operation limits of the gas turbine engine, real-time inlet guide vane schedules and real-time stability bleed schedules.

In a further embodiment of any of the above, the at least one operating parameter signal comprises current engine speed, power, torque and/or thrust of the gas turbine engine.

In a further embodiment of any of the above, the adaptation logic module comprises: a comparator configured operative to determine an error signal comprising a difference between the at least one goal signal and the at least one operating parameter signal; a low pass filter configured operable to receive the error signal and produce a filtered error signal; an integrator configured operable to receive the filtered error signal and produce an integrated error signal; and a look-up table configured operable to produce the bandwidth signal based at least in part on at least one of the filtered error signal and the integrated error signal.

In a further embodiment of any of the above, the model-based estimation module comprises: a comparator configured operative to determine an error signal comprising a difference between the at least at least one operating parameter signal and a measurement of the engine estimate signal; a bias estimator configured operable to receive the error signal and the bandwidth signal and to produce a bias signal; a state variable model configured operative to produce a prediction signal indicative of a current state of the gas turbine engine; a prediction signal biasing device configured operable to receive the bias signal and the prediction signal and produce a predicted parameter signal indicative of the current state of the gas turbine engine; and a data storage device configured operable to store the predicted parameter signal and to produce the engine estimate signal.

In a further embodiment of any of the above, the bias estimator comprises one of a low pass filter, a Kalman filter, a neural network, optimal estimation, recursive system identification, asymptotic observer and an adaptive logic based on L1 adaptive control theory.

In another embodiment, a control system for a gas turbine engine including a power turbine is disclosed, the control system comprising: at least one sensor operably coupled toin communication with the gas turbine engine and configured operative to generate at least one operating parameter signal indicative of at least one operating parameter of the gas turbine engine; a load control module configured operable to receive a desired power turbine speed signal and to output a power turbine torque request (Qpt_req); and an adaptation logic module configured operable to receive the desired power turbine speed signal and the at least one operating parameter signal and generate a bandwidth signal indicative of an error between the desired power turbine speed signal and the at least one operating parameter signal; a model-based estimation module configured operable to receive the bandwidth signal and generate an engine estimate signal indicative of estimated current engine parameters of the gas turbine engine based at least in part on the bandwidth signal; and a gas generator control module configured operable to receive the power turbine torque request (Qpt_req) from the load control module and the estimated current engine parameters from the model-based estimation module, to determine at least one of fuel flow, inlet guide vane schedules, and stability bleed schedules based at least in part on the received power turbine torque request (Qpt_req) and the estimated current engine parameters, and to send signals to a gas generator of the gas turbine engine in order to control the gas generator according to at least one of the determined fuel flow, inlet guide vane schedules and stability bleed schedules.

In a further embodiment of any of the above, the gas generator control module is configured to use a model-based constrained dynamic inversion methodology to determine at least one of the fuel flow, the inlet guide vane schedules and the stability bleed schedules.

In a further embodiment of any of the above, the gas generator control module comprises: a gas generator model configured to determine system data based at least in part on the at least one operating parameter; an optimization formulation module configured to determine optimization data based at least in part on the system data; and a constrained optimization solver configured to use the model-based constrained dynamic inversion of the optimization data to determine at least one of the fuel flow, the inlet guide vane schedules and the stability bleed schedules.

In a further embodiment of any of the above, the load control module comprises: a rotor model operable to receive a real-time collective lever angle command signal and to determine model system data; an optimization formulator operable to receive the model system data and to produce optimization data; and a constrained optimization solver operable to receive the optimization data and to generate the power turbine torque request (Qpt_req).

In a further embodiment of any of the above, a load is produced by a rotor coupled to the power turbine.

In a further embodiment of any of the above, the at least one operating parameter signal comprises current engine speed, power and/or thrust of the gas turbine engine.

In a further embodiment of any of the above, the adaptation logic module comprises: a comparator configured operative to determine an error signal comprising a difference between the desired power turbine speed signal and the at least one operating parameter signal; a low pass filter configured operable to receive the error signal and produce a filtered error signal; an integrator configured operable to receive the filtered error signal and produce an integrated error signal; and a look-up table configured operable to produce the bandwidth signal based at least in part on at least one of the filtered error signal and the integrated error signal.

In a further embodiment of any of the above, the model-based estimation module comprises: a comparator configured operative to determine an error signal comprising a difference between the at least at least one operating parameter signal and a feedback of the engine estimate signal; a bias estimator configured operable to receive the error signal and the bandwidth signal and to produce a bias signal; a state variable model configured operative to produce a prediction signal indicative of a current state of the gas turbine engine; a prediction signal biasing device configured operable to receive the bias signal and the prediction signal and produce a predicted parameter signal indicative of the current state of the gas turbine engine; and a data storage device configured operable to store the predicted parameter signal and to produce the engine estimate signal.

In a further embodiment of any of the above, the bias estimator comprises one of a low pass filter, a Kalman filter, a neural network, optimal estimation, recursive system identification, asymptotic observer and an adaptive logic based on L1 adaptive control theory.

In a further embodiment of any of the above, the model-based estimation module comprises: a state variable model configured operative to produce a prediction signal indicative of a current state of the gas turbine engine; a comparator configured operative to determine an error signal comprising a difference between the prediction signal and a feedback of the engine estimate signal; a low pass filter configured operable to receive the error signal and the bandwidth signal and to produce a bias signal; a prediction signal biasing device configured operable to receive the bias signal and the prediction signal and produce the engine estimate signal.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
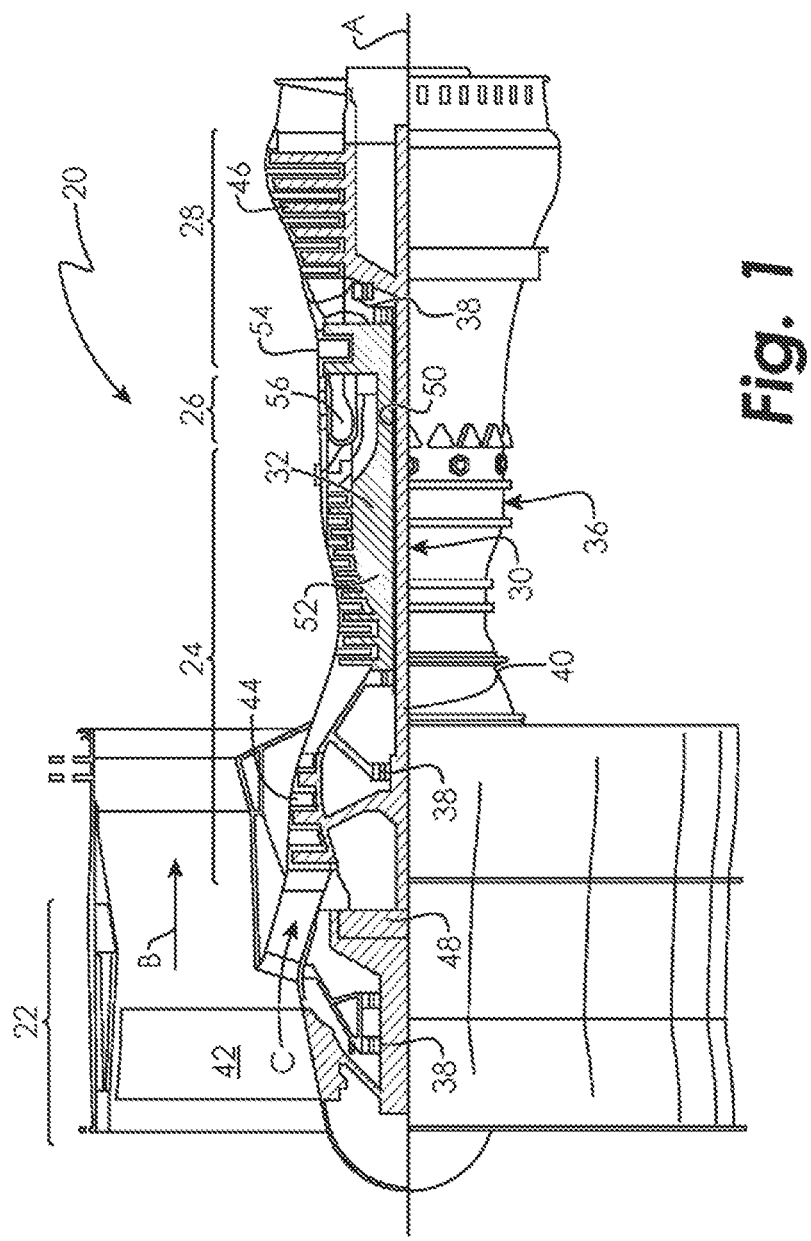
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,^\circ R)/(518.7 \,^\circ R)]^{0.5}$. The "Low corrected fan tip speed" as disclosed herein according to one non-limiting embodiment is less than about 1150 ft/second (350.5 m/sec).

The present embodiments include a system and method for controlling a multivariable system such as a gas turbine engine to compensate for real-time changes in its system parameters. The engine system parameters may include a speed of one or more of the spools, pressure, temperature and air flow of various engine components and sections, and engine operation parameters such as stall margin remain, etc. Some of the engine system parameters may be used as engine system states in a physics engine model.

Changes in the system parameters can create discrepancies between one or more predicted engine parameters and corresponding measured engine parameters, which discrepancies can be referred to as "model error". The present system and method can compensate for such changes by processing one or more goal values derived from respective goals and one or more limit values derived from respective limits along with one or more biases using a control methodology, which will be described below in further detail. The biases (sometimes referred to as "tuners", disturbances", "estimates" or "model parameters") are numerical values (e.g., −5, 3/16, 8.7, etc.) used within the control system to adjust (e.g., correct) the goal and/or limit values for modeling error due to, for example, changes in engine state, engine efficiency (or inefficiency), wear, or a net effect of these or other signals. The present system and method, therefore, can (i) quickly respond to changes in system parameters and/or (ii) enable inclusion of additional goals and/or limits.

Figure 2:
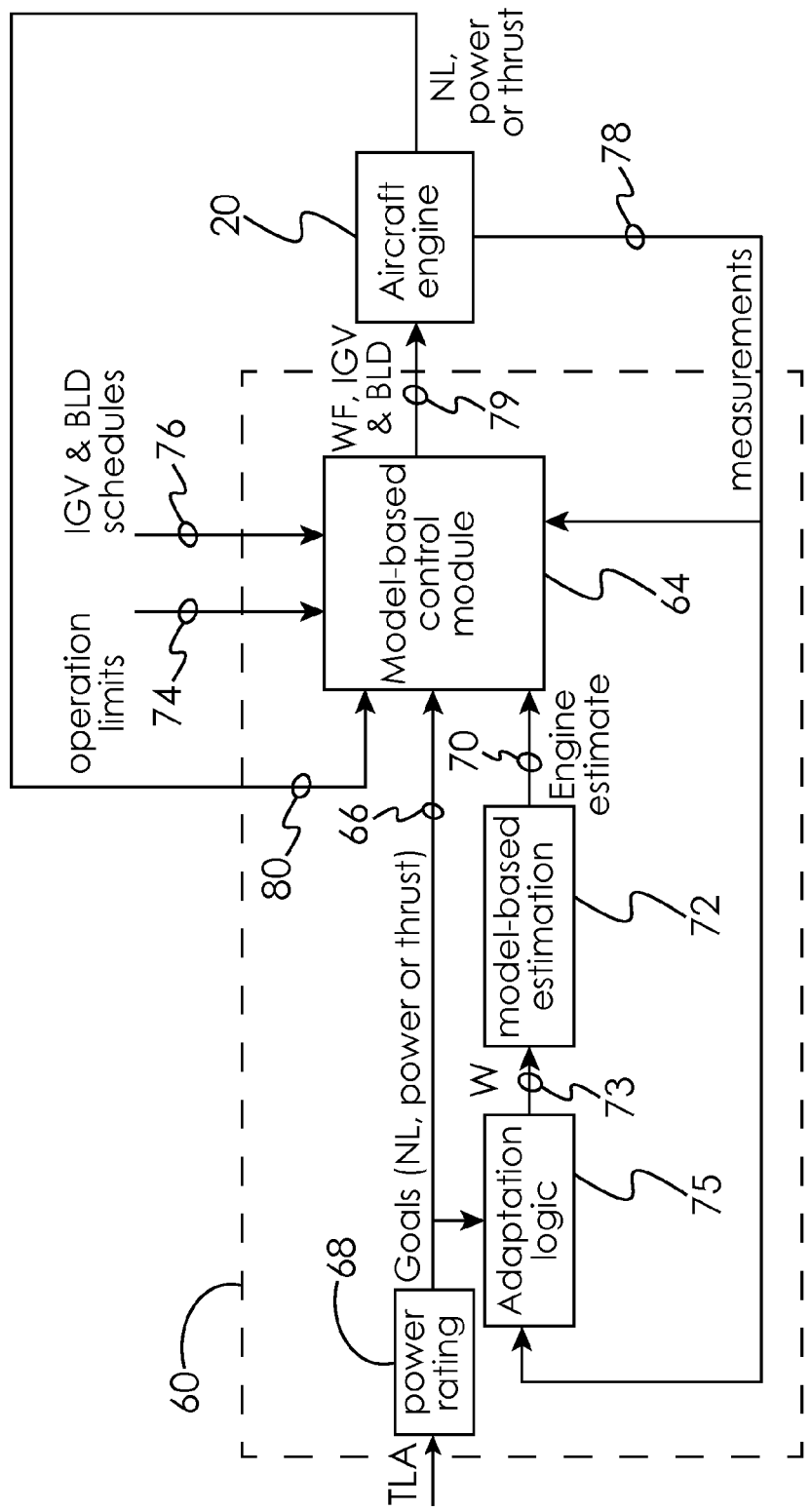
FIG. 2 is a schematic representation of a control system for the gas turbine engine of FIG. 1 in an embodiment.

Referring now to FIG. 2, a control system 60 for the gas turbine engine 20 is shown, according to an embodiment of the present disclosure. The control system 60 may comprise digital and/or analog elements. In an embodiment, the control system 60 may comprise a non-transitory computer readable storage medium having stored thereon computer-executable instructions, such as, at least one computer processor. As shown best in FIG. 2, the control system 60 may include a model-based control module 64. The model-based control module 64 is in communication with the gas turbine engine 20 (e.g., control units and/or sensors of the gas turbine engine 20). For example, the control system 60 may include a plurality of sensors operatively connected to the computer processor. The plurality of sensors may be disposed on the gas turbine engine 20, generating signals indicative of operating parameters, such as, without limitation, a real-time speed (NL), power and/or thrust 80.

The model-based control module 64 manages power demand of the gas turbine engine 20. A goals signal 66 (for example, speed (NL), power and/or thrust) may be sent to the model-based control module 64 from a power rating module 68. Power rating module 68 receives a thrust lever angle signal (TLA) from an appropriate sensor to generate goals signal. Since engine 20 speed, power and thrust are a function of the thrust lever angle (TLA), power rating module 68 may utilize tables to generate the goals signal 66 based on the thrust lever angle (TLA) command and flight conditions.

The model-based control module 64 may receive a signal indicative of estimated current engine parameters 70 in real-time from model-based estimation module 72. Model-based estimation module 72 may determine the estimated current engine parameters using a bandwidth signal 73 provided by adaptation logic module 75, as described in greater detail hereinbelow. Other inputs, such as, signals indicative of gas turbine engine limits 74, real-time inlet guide vane (IGV) and stability bleed (BLD) schedules 76, and measured values 78 from sensors on engine 20 may also be received by the model-based control module 64. Finally, model-based control module 64 may receive actual current engine 20 speed, power and/or thrust signals 80. A function of the model-based control module 64 is to make the goals signal 66 dynamically match the measurement signal 80 by controlling fuel (WF), inlet guide vane (IGV) schedules, and/or stability bleed (BLD) schedules. In some applications, if corresponding measurement signals 80 are not available for any of the goals 66 (such as thrust, for example), then estimated quantities 70 from the model-based estimation module 72 may be used. The model-based control module 64 may also choose between measurement signals 80 and estimated signals 70 for better closed-loop performance.

As used herein, the term "inlet guide vane schedules" may refer to the positioning of the low compressor stator vanes and the high compressor stator vanes. The term "stability bleed schedules", as used herein, may refer to the positioning of the bleed valves between the compressors. Both the inlet guide vane angles and the stability bleed valves may be scheduled or adjusted as a function of corrected compressor speed in a way to manage compressor stability margin.

Based at least in part on the received signals, the model-based control module 64 uses model-based constrained dynamic inversion (such as that disclosed in U.S. Patent Publication US 2013/0158680 A1, to name one non-limiting example) to determine a fuel flow (WF), inlet guide vane (IGV) schedules, and stability bleed (BLD) schedules of the engine 22 that will achieve engine 20 operation in accordance with at least a portion of the goals 66. In so doing, the model-based control module 64 manages multi-variable controls of the engine 20 to quickly respond to power demand changes. A control request signal 79 that includes a fuel flow signal (WF) indicative of the determined fuel flow request, an inlet guide vane signal (IGV) indicative of the determined inlet guide vane position request, and a stability bleed signal (BLD) indicative of the determined stability bleed position request is sent from the model-based control module 64 to the gas turbine engine 20. The fuel flow, inlet guide vane positions, and stability bleed valves of the engine 20 are then adjusted via actuators according to the control request signal 79 received from the model-based control module 64.

The adaptation logic module 75 receives both the engine 20 sensor measurements 78 and the goals 66, and uses the error between the goals 66 and the measured feedback signal 78 to determine an approximate quantity of model inaccuracy. Using this inaccuracy determination, the adaptation logic 75 determines bandwidth (i.e., weighting) signal 73 to apply to the model-based estimation module 72.

Figure 3:
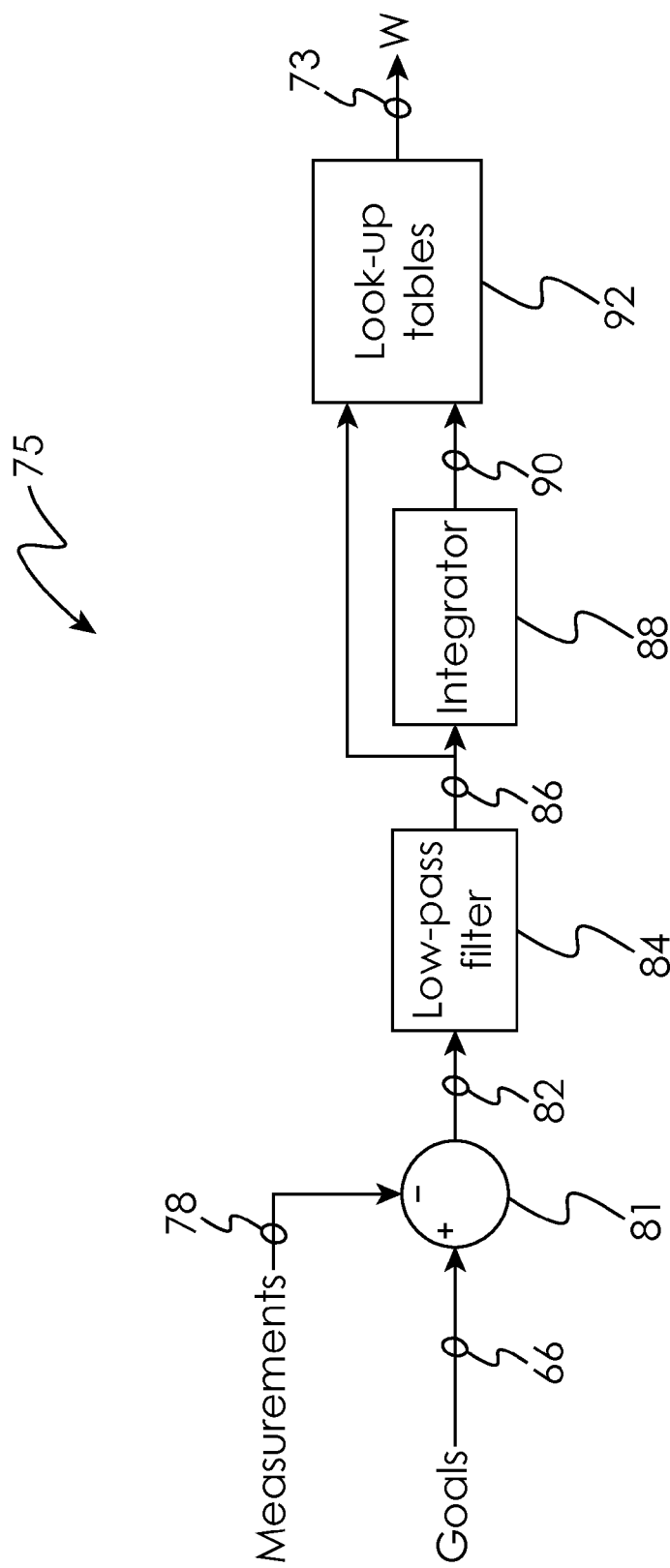
FIG. 3 is a schematic representation of an adaptation logic module for the control system of FIG. 2 in an embodiment.
Figure 4:
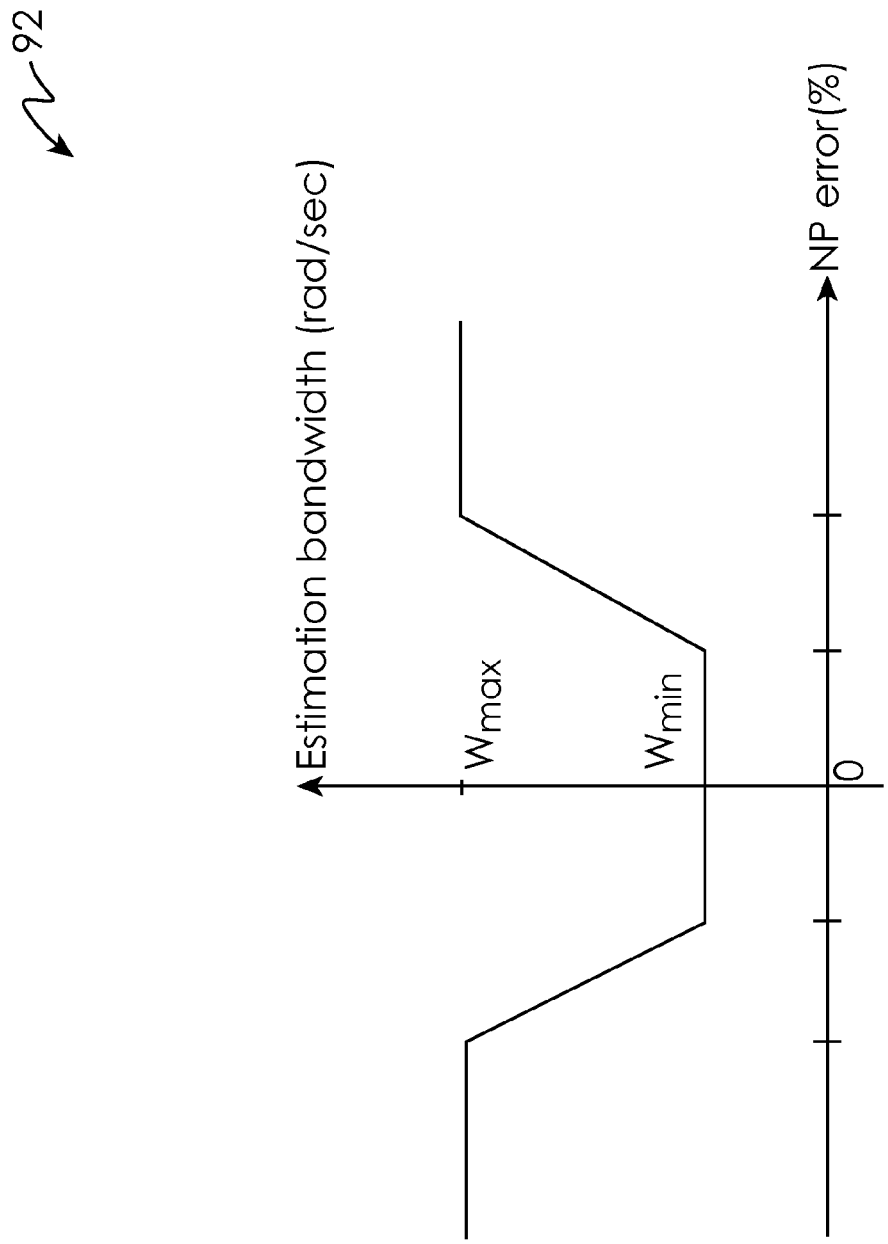
FIG. 4 is a schematic representation of a lookup table that may be used with the adaptation logic module of FIG. 3 in an embodiment.

In an embodiment, the adaptation logic module 75 may be implemented as shown in FIG. 3. A comparator 81 creates an error signal 82 by determining a difference between the goals 66 and the measured feedback signal 78. The error signal 82 is applied to a low-pass filter 84 to produce a filtered error signal 86. The low-pass filter may be a first order lag filter in an embodiment. The filtered error signal 86 is applied to an integrator 88 to produce an integrated error signal 90. At least one of the filtered error signal 86 and the integrated error signal 90 is used as an input to look-up tables 92. The output of the look-up tables 92 is the bandwidth signal 73 that is used to determine the estimation bandwidth 73. For example, the look-up tables 92 may take the form shown in FIG. 4 in an embodiment. If the integrated error signal 90 is within a predetermined nominal range (for example, for aircraft or rotorcraft operating at cruise), then a predetermined minimum bandwidth Wmin may be chosen. The smaller bandwidth Wmin means that a relatively larger weighting will be given to the linear model prediction of the model-based estimation module 72, therefore the model estimation is given relatively more weighting than the measurement feedback. If, on the other hand, the integrated error signal 90 exceeds the predetermined nominal range (for example, when a fast transient causes a large rotor excursion in a turboshaft application), then a predetermined maximum bandwidth Wmax may be chosen. The larger bandwidth Wmax means that a relatively smaller weighting will be given to the linear model prediction of the model-based estimation module 72 and a relatively larger weighting will be given to the measurement 78, thereby favoring the measurement feedback over the model prediction. In other embodiments, other methods are used to produce the bandwidth signal 73.

Figure 5:
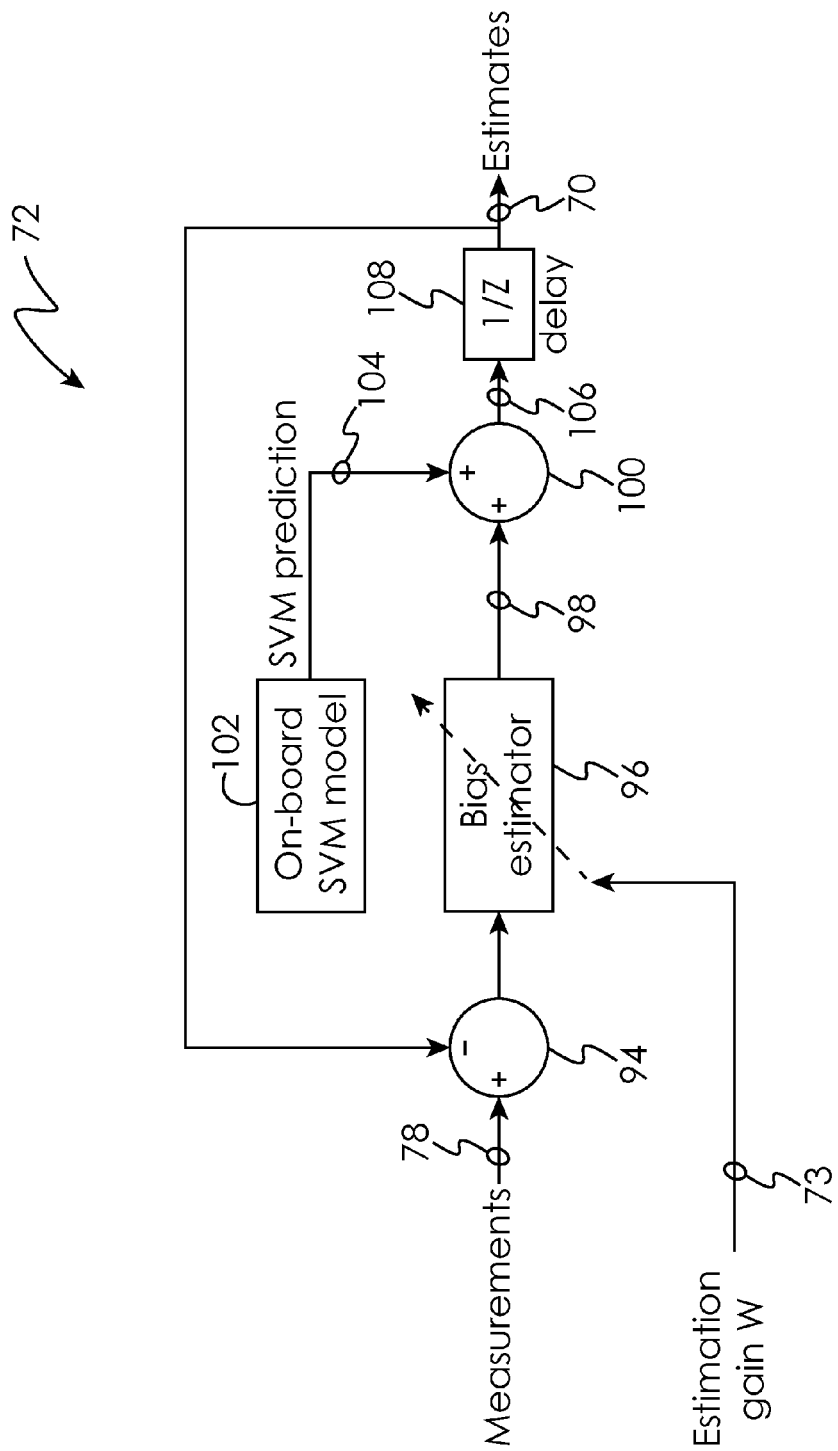
FIG. 5 is a schematic representation of a model-based estimation module for the control system of FIG. 2 in an embodiment.

In an embodiment, the model-based estimation module 72 may take the form illustrated in FIG. 5. The measured feedback signal 78 and the estimated current engine parameters 70 are applied to a comparator 94. The output of comparator 94 is applied to a bias estimator 96. An example of a suitable bias estimator 96 is disclosed in U.S. Patent Application Publication No. 2009/0281641, which is hereby incorporated by reference in its entirety. Other examples of suitable bias estimators include, for example, a low-pass filter, a Kalman filter, a neural network, optimal estimation, recursive system identification, asymptotic observer, an adaptive logic based on L1 adaptive control theory, etc. The bias estimator 96 uses the bandwidth signal 73 as a gain signal when determining a bias signal 98. An engine on-board state variable model 102 may use the control request signal 79 and/or real control actuation measurements in a real-time model prediction that produces a prediction signal 104. Both the bias signal 98 and the prediction signal 104 are summed together in the operation block 100 to produce output signal 106. The predicted parameter signal 106 is applied to a data storage device 108. The output of the data storage device 108 is the estimated current engine parameters signal 70.

Suitable examples of empirical and/or physics-based on-board models 102 are disclosed in U.S. Pat. No. 7,216,071, U.S. Pat. No. 7,277,838, U.S. Pat. No. 7,472,100, U.S. patent application Ser. No. 12/552,656, and U.S. patent application Ser. No. 12/475,038, each of which is hereby incorporated by reference in its entirety. The presently disclosed embodiments, however, are not limited to the aforesaid examples. The on-board model 102 may model, for example, how the dynamics of the engine 20 will change as a respective engine actuator responds to an effector signal to increase the fuel injection flow rate, for example. The on-board model 102 may predicted, for example, that the engine will operate at 60.5% thrust, rather than a goal 60.75% thrust, where environmental conditions have become unfavorable. One of the predicted engine parameters 104 therefore may be indicative of a fan speed that corresponds to the engine operating at 60.5% thrust.

Figure 6:
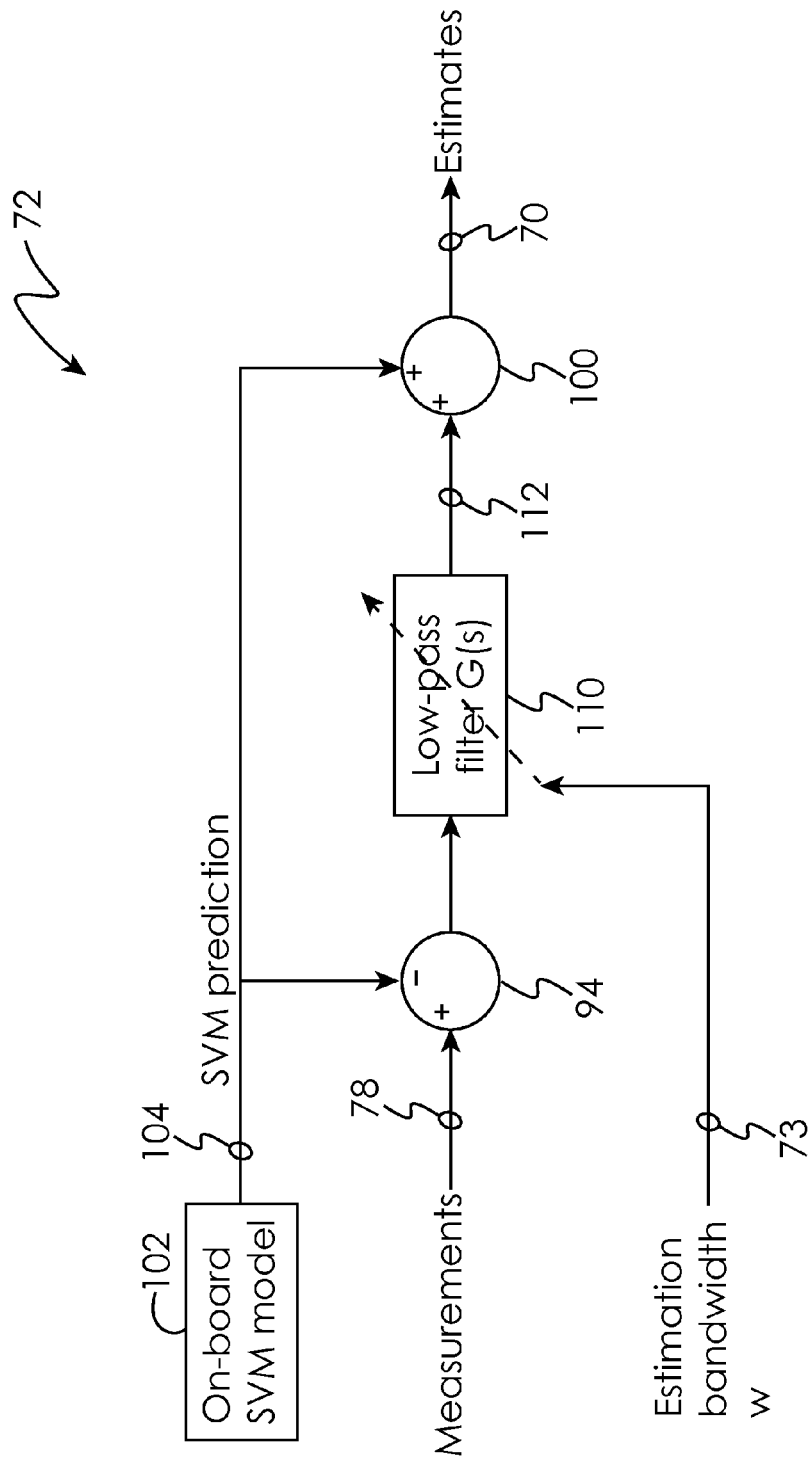
FIG. 6 is a schematic representation of a model-based estimation module for the control system of FIG. 2 in an embodiment.

In another embodiment, the model-based estimation module 72 may take the form illustrated in FIG. 6. The measured feedback signal 78 and the predicted engine parameters 104 are applied to a comparator 94. The output of comparator 94 is applied to a low pass filter 110. The bandwidth W signal 73 is also applied to the low pass filter 110. In an embodiment, the low pass filter 110 frequency response comprises:

$$G(s) = \frac{W}{S+W}$$

In another embodiment, the low pass filter 110 frequency response comprises:

$$G(s) = \frac{W^2}{S^2 + kWS + W^2}$$

An output of the low pass filter 110 is a bias signal 112. The bias signal 112 is applied as an input to the prediction signal biasing device 100. The engine on-board state variable model 102 produces a prediction signal 104 that is also applied as an input to the prediction signal biasing device 100. The output of the prediction signal biasing device 100 is the estimated current engine parameters signal 70.

Figure 12:
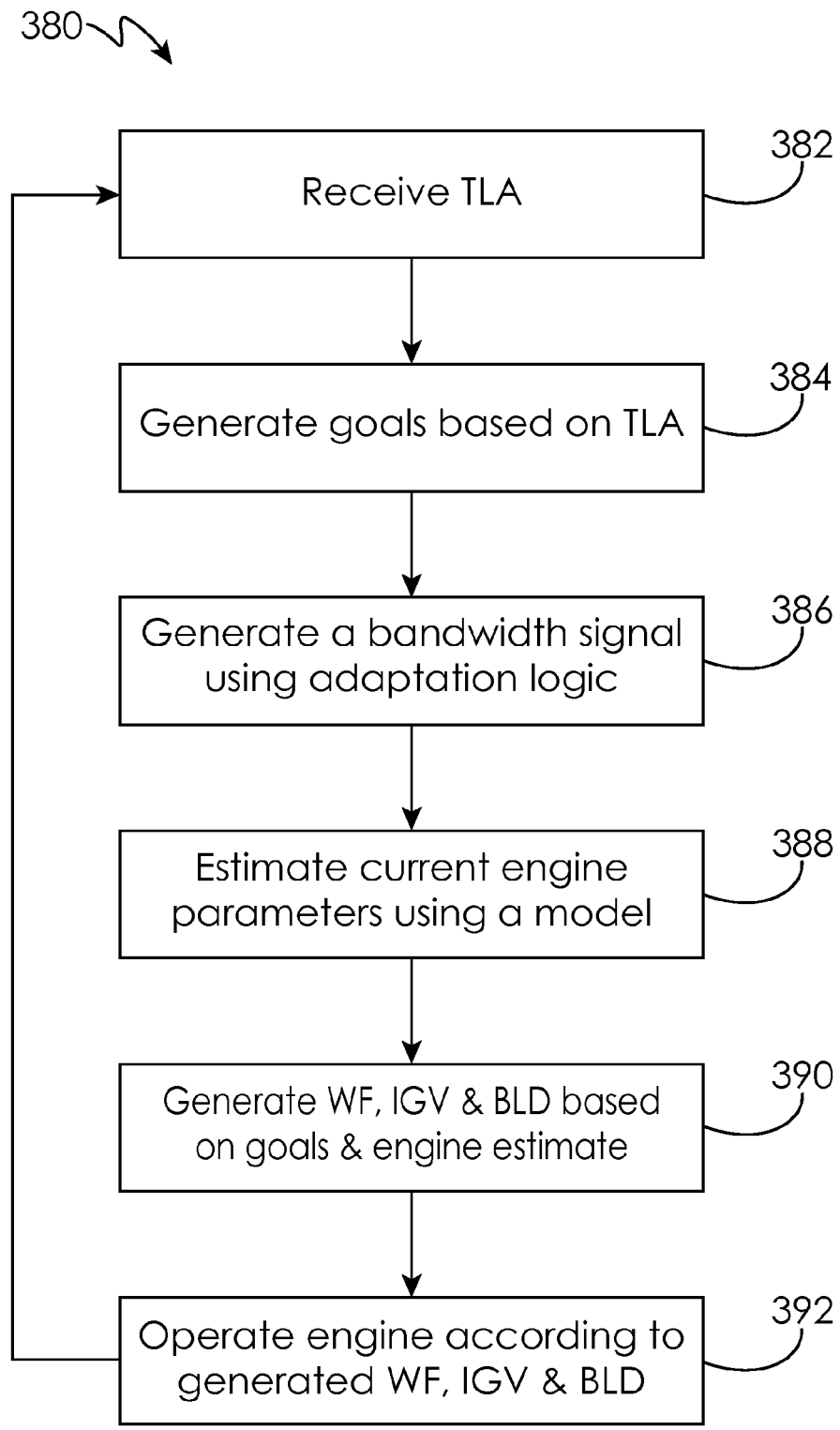
FIG. 12 is a flowchart illustrating an exemplary process for controlling a gas turbine engine, according to another embodiment of the present disclosure.

Turning now to FIG. 12, with continued reference to FIGS. 2-6, an exemplary process 380 for controlling the gas turbine engine 20 is shown. At block 382, the control system 60 may receive the sensed real-time thrust lever angle command (TLA). The power rating module 68 of the control system 60 generates the goals 66, based at least in part on the real-time thrust lever angle (TLA) command, at block 384. At block 386, a bandwidth signal 73 is generated by the adaptation logic 75. The bandwidth signal 73 is used by the model-based estimation module 72 to generate estimated current engine parameters at block 388. At block 390, the model-based control module 64 of the control system 60 generates the fuel flow (WF), the inlet guide vane (IGV), and the stability bleed (BLD) signals based at least in part on the goals 66 generated by the power rating module 68 and the estimated current engine parameters generated by the model-based estimation module 72. The gas turbine engine 20 is operated according to the generated fuel flow (WF), inlet guide vane (IGV), and stability bleed (BLD) signals at block 392.

Figure 7:
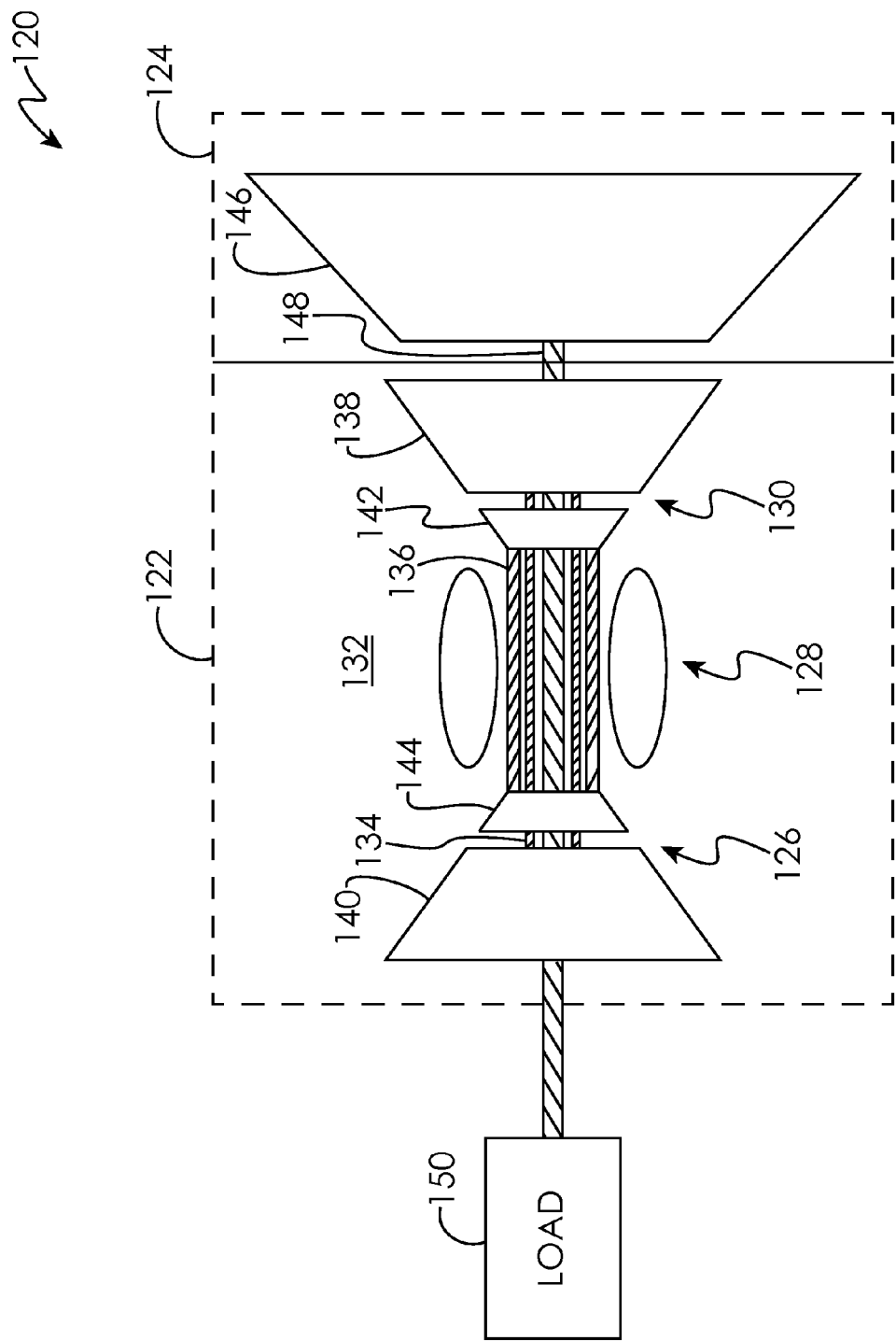
FIG. 7 is a schematic representation of a gas turbine engine, according to one embodiment of the present disclosure.

Referring now to FIG. 7, in accordance with the teachings of the disclosure, another exemplary gas turbine engine 120 is shown. In this example, the gas turbine engine 120 is a turboshaft engine, although other types of gas turbine engines are certainly applicable to this disclosure. The gas turbine engine 120 may be used on an aircraft for generating thrust or power, on a rotorcraft for generating output shaft power, or in land-based operations for generating power as well.

The gas turbine engine 120 may generally comprise a gas generator section 122 and a power turbine section 124. The gas generator section 122 may include a compressor section 126 where air is pressurized, a combustor 128 downstream of the compressor section which mixes and ignites the compressed air with fuel and thereby generates hot combustion gases, a turbine section 130 downstream of the combustor 128 for extracting power from the hot combustion gases, and an annular flow path 132 extending axially through each.

The gas generator section 122 may comprise a single-spool configuration or a two-spool configuration. In this example, the gas generator section 122 comprises a two-spool configuration, particularly, a low spool 134 and a high spool 136. Mounted to the low spool 134 is a low pressure turbine 138 which drives a low pressure compressor 140. Mounted to the high spool 136 is a high pressure turbine 142 which drives a high pressure compressor 144. More or less than two spools may certainly be used in the gas generator section 122. The power turbine section 124 of the gas turbine engine 120 comprises a power turbine 146 mounted to a power turbine spool 148. The gas generator section 122 generates combustion gas that imparts torque to the power turbine spool 148 through the power turbine 146. The power turbine spool 148 may drive a load 150, such as, without limitation, a rotor, a turbo-pump, an electrical generator, a propeller, or other load. Although not shown, a gear box may multiply the torque or power from the power turbine spool 148 to the load 150.

Figure 8:
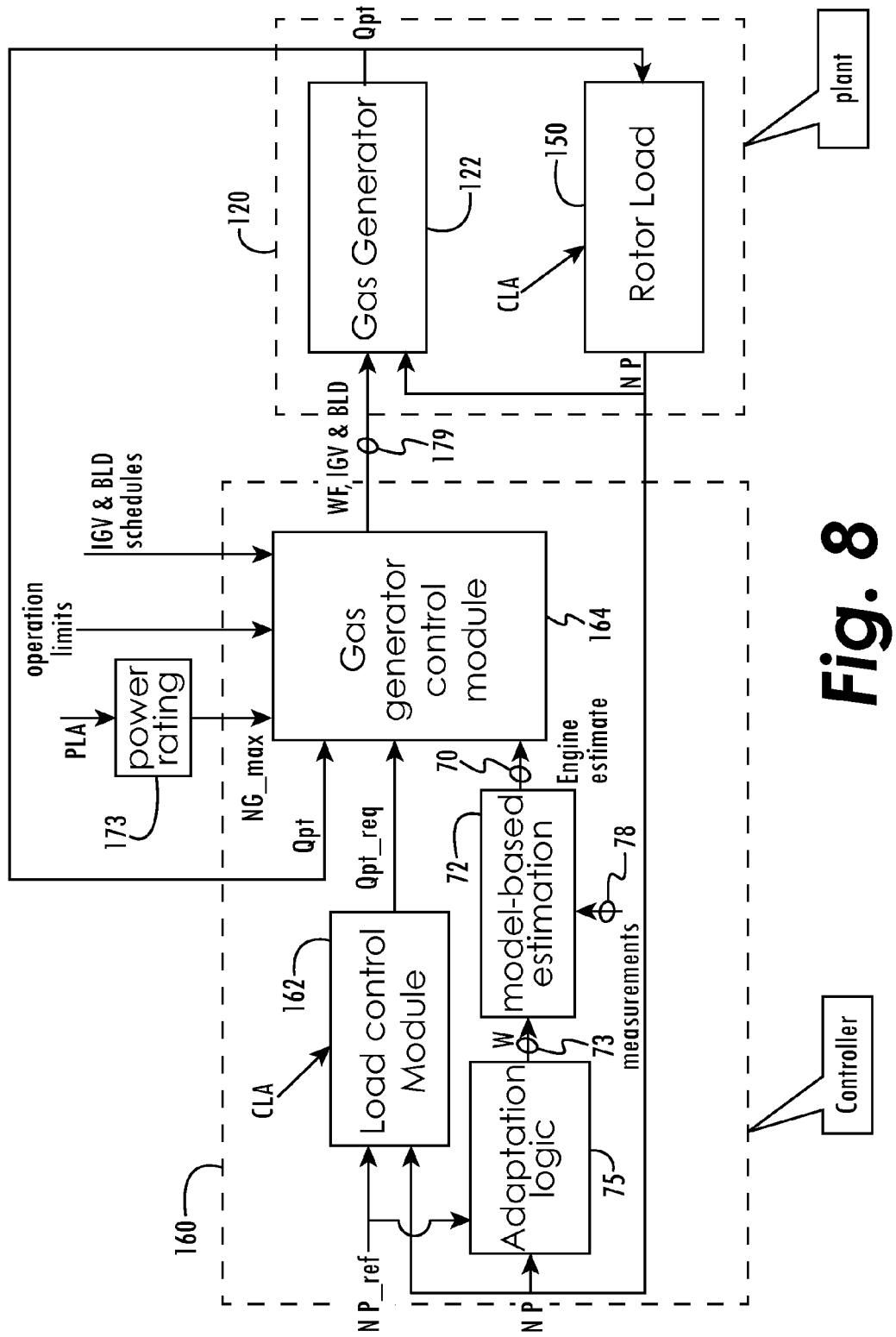
FIG. 8 is a schematic representation of a control system for the gas turbine engine of FIG. 7 in an embodiment.
Figure 9:
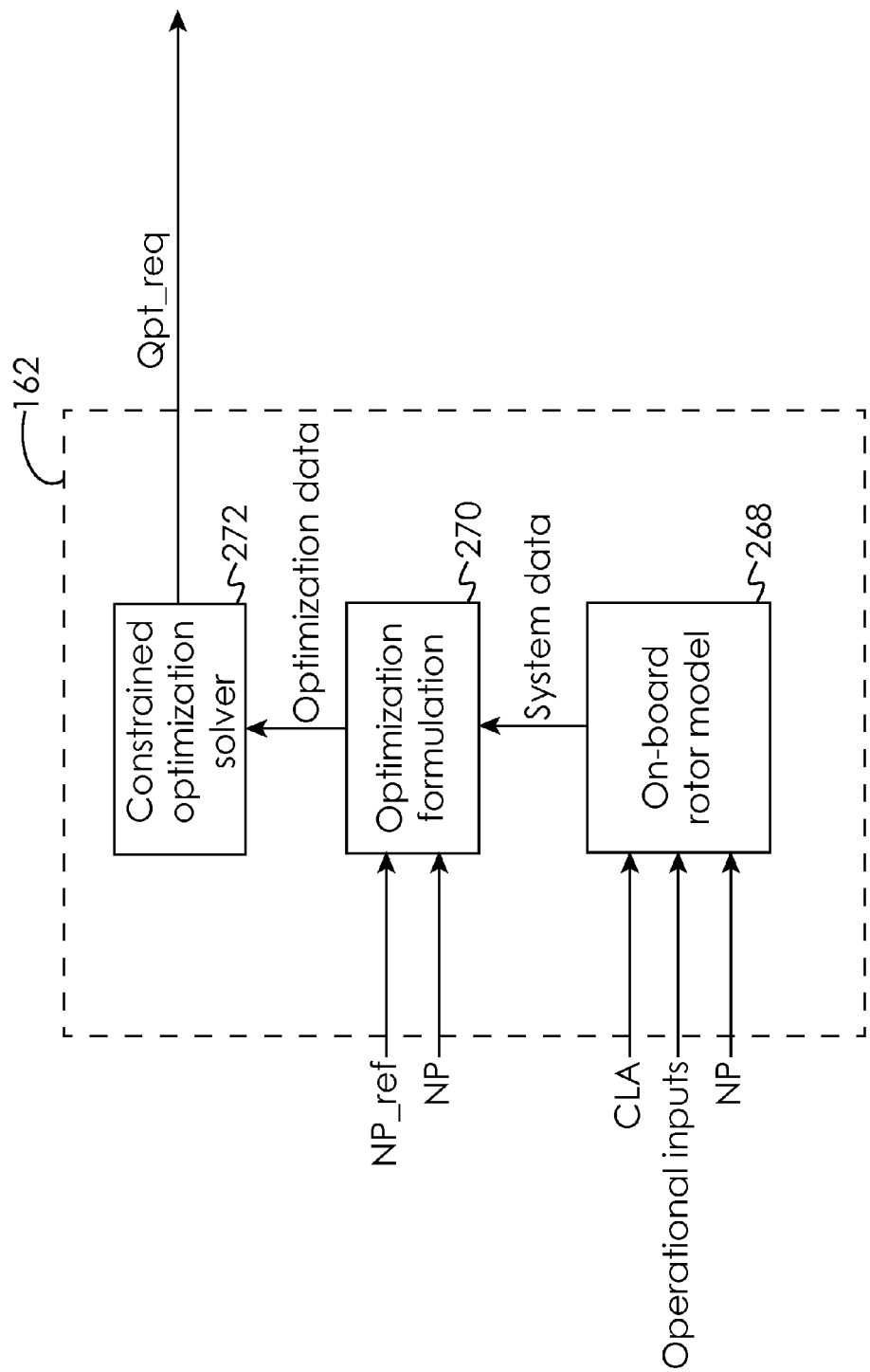
FIG. 9 is a schematic representation of an load control module for the control system of FIG. 8 in an embodiment.
Figure 10:
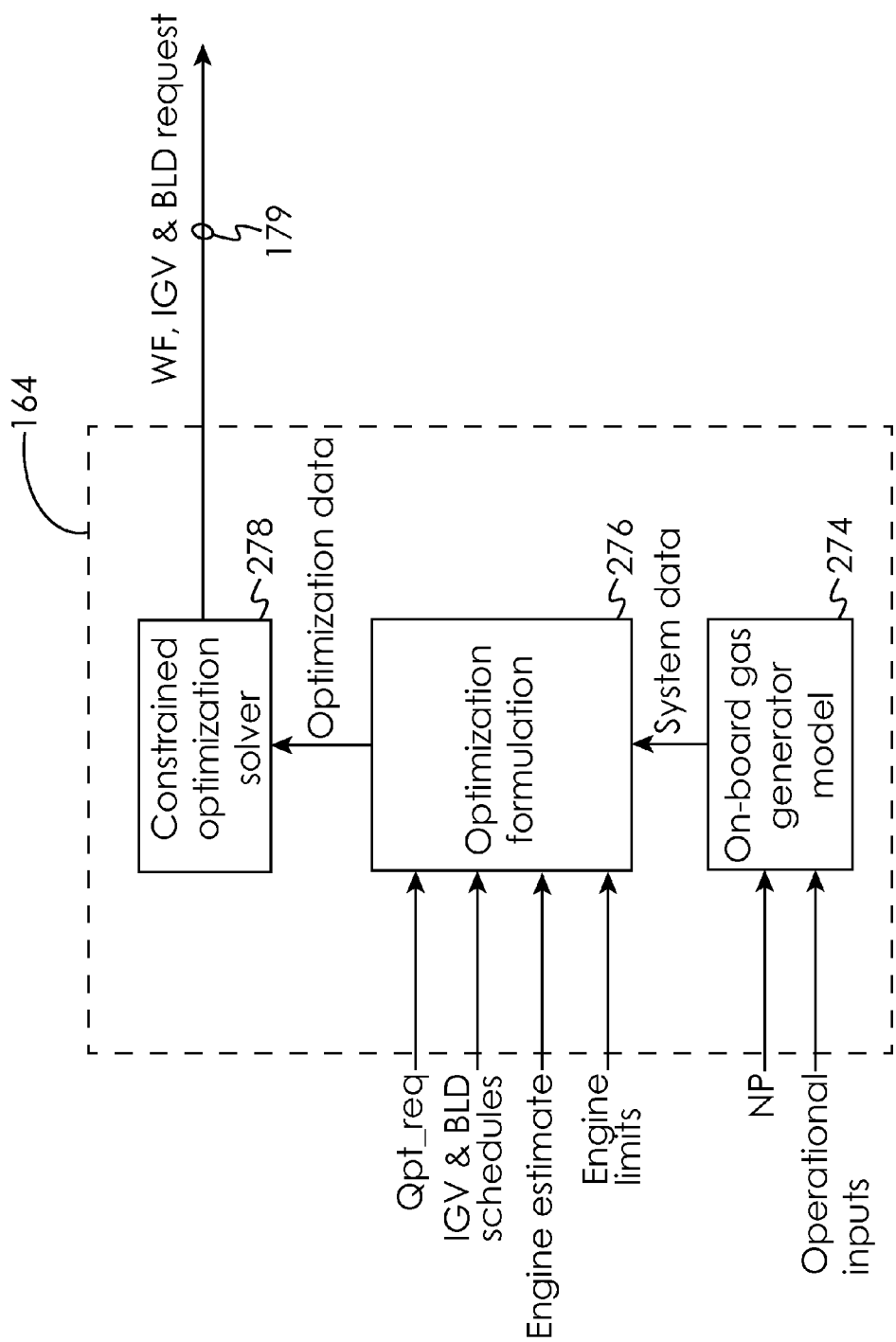
FIG. 10 is a schematic representation of a gas generator control module for the control system of FIG. 8 in an embodiment.

Referring now to FIGS. 8-10, with continued reference to FIG. 7, a control system 160 for the gas turbine engine 120 is shown, according to an embodiment of the present disclosure. The control system 160 may comprise digital and/or analog elements. In an embodiment, the control system 160 may comprise a non-transitory computer readable storage medium having stored thereon computer-executable instructions, such as, at least one computer processor. As shown best in FIG. 8, the control system 160 may include a load control module 162 in communication with a gas generator control module 164. The load and gas generator control modules 162, 164 are also in communication with the gas turbine engine 120 and load 150 (e.g., control units and/or sensors of the gas turbine engine 120 and load 150). For example, the control system 160 may include a plurality of sensors operatively connected to the computer processor. The plurality of sensors may be disposed on the gas turbine engine 120 and load 150, generating signals indicative of operating parameters, such as, without limitation, a real-time power turbine speed and a real-time estimated power turbine torque.

The load control module 162 and the gas generator control module 164 create a cascaded architecture of the control system 160 in order to manage power demand of the gas turbine engine 120 and rotor speed of the load 150. The load control module 162 may be in communication with the load 150, and the gas generator control module 164 may be in communication with the gas generator section 122 of the gas turbine engine 120. In this example, the load 150 is a combination of the power turbine and main rotor of the helicopter, although other loads are certainly possible. The gas generator section 122 and the load 150 may also be in communication with each other. In addition, a model-based estimation module 72 may be in communication with the gas generator control module 164 to provide the estimated current engine parameters 70 thereto. Adaptation logic module 75 provides the bandwidth W signal 73 to the model-based estimation module 72.

The load control module 162 may receive a signal from the rotor load 150 indicative of current power turbine speed feedback (NP) in real-time. In addition, the load control module 162 may receive a desired power turbine operation speed (NP_ref) signal and a signal indicative of a collective lever angle command (CLA), that is, a collective pitch command, in real-time. Based at least in part on the received signals, the load control module 162 determines a torque request (Qpt_req) of the power turbine that will match the power turbine speed feedback signal (NP) in real-time to the desired power turbine speed (NP_ref) by control regulation. In so doing, the load control module 162 may maintain the power turbine 146 at a same rotor speed, or power turbine speed. The ratio between rotor speed and power turbine speed may be constant and may be determined by the gear ratio of the gear box coupling the rotor to the power turbine spool in an embodiment. A signal indicative of the determined torque request (Qpt_req) is then sent from the load control module 162 to the gas generator control module 164.

In order to generate the torque request, the load control module 162 may employ inversion of a dynamic model. For example, as shown in FIG. 9, the load control module 162 may include a rotor model 268, an optimization formulator 270, and a constrained optimization solver 272. The rotor model 268 may model dynamic behavior of the rotor. It is to be understood that the model 268 may apply to other loads than the rotor, such as, without limitation, a turbo-pump, an electrical generator, a propeller, or the like. The load control module 162 may also employ other methods, such as, proportional integral plus feed-forward control methods as an approach for dynamically matching the desired power turbine operation speed (NP_ref) and the current power turbine speed feedback (NP) so as to determine the power turbine torque request signal (Qpt_req) for the load control module 162.

The rotor model 268 may be a linear or nonlinear (e.g., differential algebraic equations, possibly in numerical simulation form), physics and data-based model based at least in part on the power turbine speed feedback signal (NP) and collective lever angle command (CLA). In addition, the model 268 may be based on other inputs, such as operational inputs or environmental conditions including airframe speed, power turbine speed percentage, collective lever angle percentage, and autorotation mode (e.g., autorotation and autorotation recovery). Optimization formulator 270 may receive model system data from the rotor model 268, as well as the desired power turbine speed (NP_ref) and the power turbine speed feedback signal (NP). Based on those inputs, optimization formulator 270 may formulate an optimization problem for which optimization software will be able to solve as a numerically iterative process in real-time.

Constrained optimization solver 272 may receive optimization data from the optimization formulator 270 in order to generate power turbine torque request (Qpt_req). Constrained optimization solver 272 may be a numerical iteration tool which finds a solution to the optimization problem formulated by optimization formulator 270. In addition, constrained optimization solver 272 may be constrained to certain limits, such as, a torque limit of the power turbine 124. In so doing, the load control module 162 utilizes constrained dynamic inversion of the rotor model in real-time to generate the torque request (Qpt_req).

Referring back to FIG. 8, the gas generator control module 164 receives the power turbine torque request signal (Qpt_req) from the load control module 162. In addition, the gas generator control module 164 may receive a signal indicative of an estimated power turbine torque (Qpt_est) in real-time from the model-based estimation module 72. Other inputs, such as, signals indicative of gas generator speed maximum limit (NG_max), gas turbine engine limits, and inlet guide vane (IGV) and stability bleed (BLD) schedules in real-time may also be received by the gas generator control module 164.

The gas generator speed maximum limit (NG_max) signal may be sent to the gas generator control module 164 from a power rating module 173. Power rating module 173 receives a power lever angle signal (PLA) to generate gas generator speed maximum limit (NG_max) signal. Since gas generator speed is a function of power lever angle, power rating module 173 may utilize tables to generate the gas generator speed maximum limit (NG_max) signal based on the power lever angle (PLA) command.

As used herein, the term "inlet guide vane schedules" may refer to the positioning of the low compressor stator vanes and the high compressor stator vanes. The term "stability bleed schedules", as used herein, may refer to the positioning of the bleed valves between the compressors. Both the inlet guide vane angles and the stability bleed valves may be scheduled or adjusted as a function of corrected compressor speed in a way to manage compressor stability margin.

Based at least in part on the received signals, the gas generator control module 164 determines a fuel flow (WF), inlet guide vane (IGV) schedules, and stability bleed (BLD) schedules of the gas generator section 122 that will deliver the power turbine torque request (Qpt_req) generated by the load control module 162. In so doing, the gas generator control module 164 manages multi-variable controls of the gas generator section 122 to quickly respond to power demand changes. A fuel flow signal (WF) indicative of the determined fuel flow, an inlet guide vane signal (IGV) indicative of the determined inlet guide vane schedules, and a stability bleed signal (BLD) indicative of the determined stability bleed schedules (collectively, signal 179) are sent from the gas generator control module 164 to the gas generator section 122 of the gas turbine engine 120. The fuel flow, inlet guide vane positions, and stability bleed valves of the gas generator section 122 are then adjusted according to the signals received from the gas generator control module 164.

In order to generate the fuel flow (WF), inlet guide vane schedules (IGV), and stability bleed schedules (BLD), the gas generator control module 164 employs a dynamical inversion approach. For example, as shown in FIG. 10, the gas generator control module 164 may include a gas generator model 274, an optimization formulator 276, and a constrained optimization solver 278. The gas generator model 274 may describe dynamic behavior of the gas generator. The gas generator model 274 may be a linear or nonlinear (e.g., differential algebraic equations, possibly in numerical simulation form), physics and data-based model based at least in part on the power turbine speed feedback signal (NP) and operational inputs. The operational inputs may include, but not be limited to an altitude of the airframe (ambient pressure over standard day pressure) and a corrected speed of the rotor spool.

Optimization formulator 276 may receive collect real-time data to formulate an optimization cost function (in part based on an error between a desired goal and the current state of a variable), and to formulate optimization constraints (in part based on an operational boundary of a variable in real physics). To do so, the optimization formulator 276 may use the power turbine torque request (Qpt_req) and the estimated power turbine torque signal (Qpt_est) to determine a cost function of the power turbine torque goal. The optimization formulator 276 may also use the IGV and BLD schedules together with the system data from the gas-generator model 274 to determine a cost function of the actuation goal. The optimization formulator 276 may further use the system data from the gas-generator model 274 together with the engine limits of the gas turbine engine 20, such as, without limitation, a rotor speed limit, a compressor stall limit, a lean blowout limit, a temperature limit, a pressure limit, or the like, as the optimization constraint data in formulating an optimization problem. Based on those inputs, optimization formulator 276 may formulate an optimization problem for which optimization software will be able to solve as a numerically iterative process in real-time. Constrained optimization solver 278 may receive optimization data from the optimization formulator 276 in order to generate the requested fuel flow, inlet guide vane schedules, and stability bleed schedules (WF, IGV & BLD request). Constrained optimization solver 278 may be a numerical iteration tool which finds a solution to the optimization problem formulated by optimization formulator 276 using a model-based constrained dynamic inversion (such as that disclosed in U.S. Patent Publication US 2013/0158680 A1, to name one non-limiting example). Real-time implementation of the gas generator control module 164 generates values for fuel flow, inlet guide vane schedules, and stability bleed schedules that deliver a torque of the power turbine section 24 that is proximate or equal to the torque request (Qpt_req) and within the limits of the gas turbine engine 120.

Figure 11:
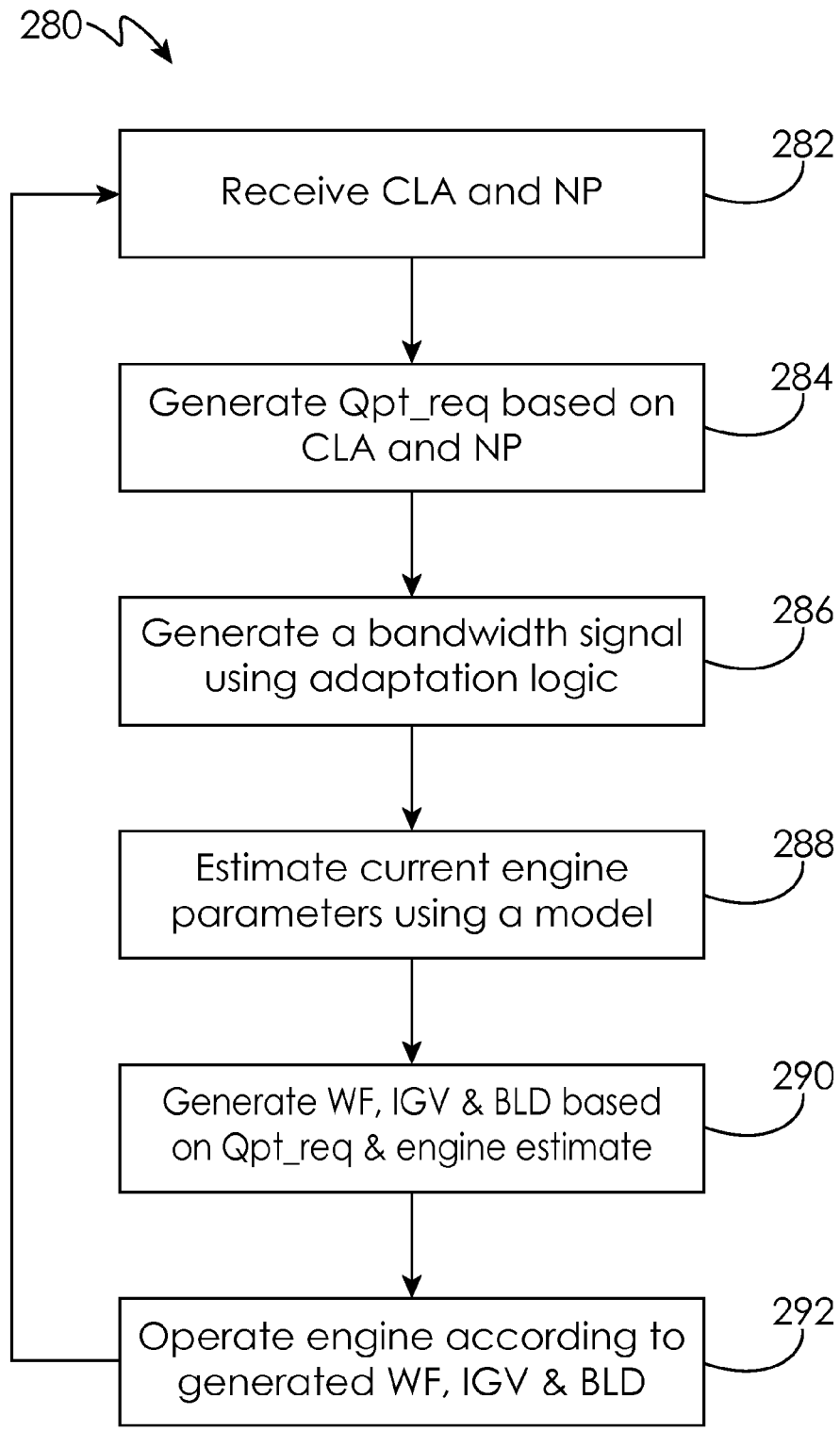
FIG. 11 is a flowchart illustrating an exemplary process for controlling a gas turbine engine, according to another embodiment of the present disclosure.

Turning now to FIG. 11, with continued reference to FIGS. 8-10, an exemplary process 280 for controlling the gas turbine engine 120 is shown. At block 282, the control system 160 may receive the real-time collective lever angle command (CLA) and the real-time power turbine speed (NP) signal. The load control module 162 of the control system 160 generates the torque request (Qpt_req) based at least in part on the real-time collective lever angle (CLA) command and the real-time power turbine speed (NP) signal, at block 284. At block 286, a bandwidth signal 73 is generated by the adaptation logic 75. The bandwidth signal 73 is used by the model-based estimation module 72 to generate estimated current engine parameters at block 288. At block 290, the gas generator control module 164 of the control system 160 generates the fuel flow (WF), the inlet guide vane (IGV), and the stability bleed (BLD) signals based at least in part on the generated torque request (Qpt_req) by the load control module 162 and the estimated current engine parameters generated by the model-based estimation module 72. The gas turbine engine 120 is operated according to the generated fuel flow (WF), inlet guide vane (IGV), and stability bleed (BLD) signals at block 292. More specifically, the gas generator control module 164 sends the fuel flow, inlet guide vane, and stability bleed signals to the gas generator section 122 of the gas turbine engine 120 in order to control the torque output of the power turbine section 124.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, on rotorcraft for generating output shaft power, or in land, marine, or aircraft applications for generating power.

The described disclosure provides a multi-variable control system embedded with an adaptive estimation module for a gas turbine engine. In one non-limiting example, the presently disclosed control systems and methods may find application in the control of a turboshaft engine, where they allow for the gas turbine engine to promptly deliver a requested change in power demand during flight maneuvers, while at the same time, minimizing power turbine speed excursion caused by a rotor load at various power levels. The disclosed system and method coordinate multi-variable controls, i.e., fuel flow and ingle guide vane schedules, in order to meet the power demand under engine operation limits.

The cascaded architecture of the disclosed control system includes a load control module for power turbine control and a gas generator control module for gas generator control. Based on a collective lever angle command from a pilot of the aircraft, the load control module calculates a power turbine torque request based upon a power turbine speed error, thereby minimizing the power turbine speed excursion. In order to minimize error between the calculated power turbine torque request and an estimated real-time power turbine torque, the gas generator control module utilizes a real-time implementation of a dynamic model for the gas generator to regulate both fuel flow and inlet guide vanes of the gas turbine engine.

By using the control system and method disclosed herein, rotor speed excursion is reduced during quick changes in load or power demand, thereby providing improved flight handling quality at various power levels. In addition, more consistent compressor stall/surge protection is provided due to the limits or constraints incorporated into the gas generator control module. Furthermore, as applied to a turboshaft engine, the multi-variable control system with cascaded architecture affords smoother transients between autorotation and recovery. Moreover, the disclosed system and method provides improved integration with different airframes in load changes.

While the presently disclosed embodiments have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A control system for a gas turbine engine, the control system comprising:
    a first sensor configured to generate a thrust lever angle signal indicative of a thrust lever angle commanded of the gas turbine engine;
    a second sensor in communication with the gas turbine engine and configured to generate at least one operating parameter signal indicative of at least one operating parameter of the gas turbine engine;
    a power rating module configured to receive the thrust lever angle signal and generate at least one goal signal indicative of an operating point goal for the gas turbine engine;
    an adaptation logic module configured to receive the at least one goal signal and the at least one operating parameter signal and generate a bandwidth signal indicative of an error between the at least one goal signal and the at least one operating parameter signal;
    a model-based estimation module configured to receive the bandwidth signal and generate an engine estimate signal indicative of estimated current engine parameters of the gas turbine engine based at least in part on the bandwidth signal; and
    a model-based control module configured to receive the at least one operating parameter signal, the at least one goal signal, and the engine estimate signal and to determine at least one of fuel flow, inlet guide vane schedules and stability bleed schedules based at least in part on the received at least one operating parameter signal, the at least one goal signal and the engine estimate signal, and to send effector signals to a gas generator of the gas turbine engine in order to control the gas generator according to at least one of the determined fuel flow, inlet guide vane schedules and stability bleed schedules.

2. The control system of claim 1, wherein the model-based control module is configured to use a model-based constrained dynamic inversion methodology to determine at least one of the fuel flow, the inlet guide vane schedules and the stability bleed schedules.

3. The control system of claim 1, wherein the at least one operating parameter signal comprises at least one of real-time speed, power, torque and thrust of the gas turbine engine.

4. The control system of claim 1, wherein the power rating module utilizes predetermined tables to generate the at least one goal signal.

5. The control system of claim 1, wherein the model-based control module is further configured to receive signals indicative of operation limits of the gas turbine engine, real-time inlet guide vane schedules and real-time stability bleed schedules.

6. The control system of claim 1, wherein the at least one operating parameter signal comprises current engine speed, power, torque and/or thrust of the gas turbine engine.

7. The control system of claim 1, wherein the adaptation logic module comprises:
    a comparator configured to determine an error signal comprising a difference between the at least one goal signal and the at least one operating parameter signal;
    a low pass filter configured to receive the error signal and produce a filtered error signal;
    an integrator configured to receive the filtered error signal and produce an integrated error signal; and
    a look-up table configured to produce the bandwidth signal based at least in part on at least one of the filtered error signal and the integrated error signal.

8. The control system of claim 1, wherein the model-based estimation module comprises:
    a comparator configured to determine an error signal comprising a difference between the at least at least one operating parameter signal and a measurement of the engine estimate signal;
    a bias estimator configured to receive the error signal and the bandwidth signal and to produce a bias signal;
    a state variable model configured to produce a prediction signal indicative of a current state of the gas turbine engine;
    a prediction signal biasing device configured to receive the bias signal and the prediction signal and produce a predicted parameter signal indicative of the current state of the gas turbine engine; and
    a data storage device configured to store the predicted parameter signal and to produce the engine estimate signal.

9. The control system of claim 8, wherein the bias estimator comprises one of a low pass filter, a Kalman filter, a neural network, optimal estimation, recursive system identification, asymptotic observer and an adaptive logic based on L1 adaptive control theory.

10. The control system of claim 1, wherein the model-based estimation module comprises:
    a state variable model configured to produce a prediction signal indicative of a current state of the gas turbine engine;
    a comparator configured to determine an error signal comprising a difference between the prediction signal and a feedback of the engine estimate signal;
    a low pass filter configured to receive the error signal and the bandwidth signal and to produce a bias signal;
    a prediction signal biasing device configured to receive the bias signal and the prediction signal and produce the engine estimate signal.

11. A control system for a gas turbine engine including a power turbine, the control system comprising:
    a sensor in communication with the gas turbine engine and configured to generate at least one operating parameter signal indicative of at least one operating parameter of the gas turbine engine;
    a load control module configured to receive a desired power turbine speed signal and to output a power turbine torque request (Qpt_req); and
    an adaptation logic module configured to receive the desired power turbine speed signal and the at least one operating parameter signal and generate a bandwidth signal indicative of an error between the desired power turbine speed signal and the at least one operating parameter signal;

a model-based estimation module configured to receive the bandwidth signal and generate an engine estimate signal indicative of estimated current engine parameters of the gas turbine engine based at least in part on the bandwidth signal; and a gas generator control module configured to receive the power turbine torque request (Qpt_req) from the load control module and the estimated current engine parameters from the model-based estimation module, to determine at least one of fuel flow, inlet guide vane schedules, and stability bleed schedules based at least in part on the received power turbine torque request (Qpt_req) and the estimated current engine parameters, and to send signals to a gas generator of the gas turbine engine in order to control the gas generator according to at least one of the determined fuel flow, inlet guide vane schedules and stability bleed schedules.

12. The control system of claim 11, wherein the gas generator control module is configured to use a model-based constrained dynamic inversion methodology to determine at least one of the fuel flow, the inlet guide vane schedules and the stability bleed schedules.

13. The control system of claim 12, wherein the gas generator control module comprises:
   a gas generator model configured to determine system data based at least in part on the at least one operating parameter;
   an optimization formulation module configured to determine optimization data based at least in part on the system data; and
   a constrained optimization solver configured to use the model-based constrained dynamic inversion of the optimization data to determine at least one of the fuel flow, the inlet guide vane schedules and the stability bleed schedules.

14. The control system of claim 11, wherein the load control module comprises:
   a rotor model configured to receive a real-time collective lever angle command signal and to determine model system data;
   an optimization formulator configured to receive the model system data and to produce optimization data; and
   a constrained optimization solver configured to receive the optimization data and to generate the power turbine torque request (Qpt_req).

15. The control system of claim 11, wherein a load is produced by a rotor coupled to the power turbine.

16. The control system of claim 11, wherein the at least one operating parameter signal comprises current engine speed, power and/or thrust of the gas turbine engine.

17. The control system of claim 11, wherein the adaptation logic module comprises:
   a comparator configured to determine an error signal comprising a difference between the desired power turbine speed signal and the at least one operating parameter signal;
   a low pass filter configured to receive the error signal and produce a filtered error signal;
   an integrator configured to receive the filtered error signal and produce an integrated error signal; and
   a look-up table configured to produce the bandwidth signal based at least in part on at least one of the filtered error signal and the integrated error signal.

18. The control system of claim 11, wherein the model-based estimation module comprises:
   a comparator configured to determine an error signal comprising a difference between the at least at least one operating parameter signal and a feedback of the engine estimate signal;
   a bias estimator configured to receive the error signal and the bandwidth signal and to produce a bias signal;
   a state variable model configured to produce a prediction signal indicative of a current state of the gas turbine engine;
   a prediction signal biasing device configured to receive the bias signal and the prediction signal and produce a predicted parameter signal indicative of the current state of the gas turbine engine; and
   a data storage device configured to store the predicted parameter signal and to produce the engine estimate signal.

19. The control system of claim 18, wherein the bias estimator comprises one of a low pass filter, a Kalman filter, a neural network, optimal estimation, recursive system identification, asymptotic observer and an adaptive logic based on L1 adaptive control theory.

20. The control system of claim 11, wherein the model-based estimation module comprises:
   a state variable model configured to produce a prediction signal indicative of a current state of the gas turbine engine;
   a comparator configured to determine an error signal comprising a difference between the prediction signal and a feedback of the engine estimate signal;
   a low pass filter configured to receive the error signal and the bandwidth signal and to produce a bias signal;
   a prediction signal biasing device configured to receive the bias signal and the prediction signal and produce the engine estimate signal.

* * * * *